United States Patent
Weman

[11] 3,711,058
[45] Jan. 16, 1973

[54] APPARATUS FOR INDUCTOR CURRENT CONTROL IN ELECTRIC ARC WELDING

[75] Inventor: Klas Bertil Weman, Laxa, Sweden

[73] Assignee: Elektriska Svetsningsaktiebolaget, Gothenburg, Sweden

[22] Filed: Jan. 5, 1971

[21] Appl. No.: 103,982

[30] Foreign Application Priority Data

Jan. 14, 1970 Sweden ............................ 386/70

[52] U.S. Cl. ........................ 219/131 WR, 219/137
[51] Int. Cl. ........................................... B23k 9/10
[58] Field of Search ...... 219/131, 137, 135; 307/100, 307/104, 106, 131, 152

[56] References Cited

UNITED STATES PATENTS 3,078,362  2/1963  Steinert .......................... 219/135
3,291,960  12/1966  Folkhard et al. ................ 219/131

Primary Examiner—J. V. Truhe
Assistant Examiner—George A. Montanye
Attorney—Cameron, Kerkam & Sutton

[57] ABSTRACT

A D.C. arc welding current contains an inductor connected in parallel with a shunt branch containing a half-wave rectifier and a resistor. The rectifier is poled so as to block the current produced in said shunt branch by the voltage induced in the inductor on decay of the magnetic flux in the inductor. Time-delayed switching means responsive to a flow of welding current are provided for reducing the conductivity of the shunt branch from a first level to a second level (which may be zero).

5 Claims, 6 Drawing Figures

APPARATUS FOR INDUCTOR CURRENT CONTROL IN ELECTRIC ARC WELDING

Figure 2:
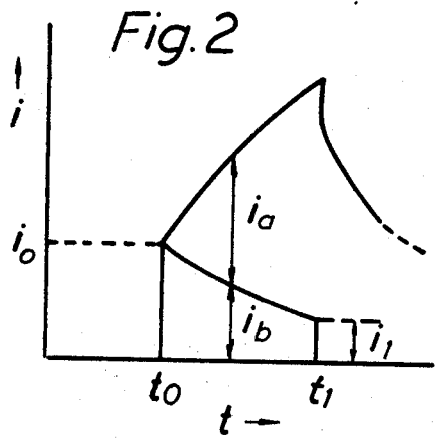

This invention relates to apparatus for electric arc welding with a consumable electrode advanced at a constant rate and energized by a D.C. source of welding power through a circuit including an inductor. More particularly, the invention is concerned with apparatus of this type in which a winding of the inductor is connected to a shunt branch containing a resistor in series with a half-wave rectifier poled to block a flow of current through said branch caused by the voltage induced in said winding on decay of the magnetic flux in said inductor. Said shunt branch, the purpose of which is to control the rate of rise of the welding current, may be connected across the ends of the main winding of the inductor, as shown in FIG. 8 of the U.S. Pat. No. 3,291,960, Folkhard et al., or connected to an auxiliary winding of the inductor, as shown in FIG. 2 of the U.S. Pat. No. 3,078,362, E.F. Steinert.

Apparatus of the kind above referred to are known to be particularly useful for short arc welding (also referred to as welding with short-circuiting metal transfer) with a source of welding power having a substantially flat characteristic, or a characteristic exhibiting a slope not exceeding 8 volts per 100 amps. Some difficulties have, however, been caused by the fact that the conditions for the ignition of the arc are less favorable during the starting period, in which the electrode meets a comparatively cold workpiece, than during the subsequent welding period proper, during which the electrode tip cooperates with a pool of liquid metal. The resulting problems were particularly serious in welding operations requiring an absolutely reliable starting of the welding operation, for instance in arc spot welding. To exclude start failures, the choice of the welding circuit parameters had to deviate considerably from the one required to provide the best conditions during the welding period proper.

The invention has for its principal object to provide apparatus of the kind referred to in which the above difficulties are avoided by the provision of means by which the apparatus is caused to provide one set of parameters during the starting period and a different set of parameters during the welding period proper.

According to one feature of the invention, switching means are provided for reducing the conductivity of the shunt branch in respect of currents having the direction admitted by the half-wave rectifier connected in said branch from a first level to a substantially lower level, and delayed means responsive to a flow of welding current for operating said switching means.

Other objects, features and advantages will appear from the following more detailed description of illustrative embodiments of the invention, which will now be given in conjunction with the accompanying drawings.

Figure 1:
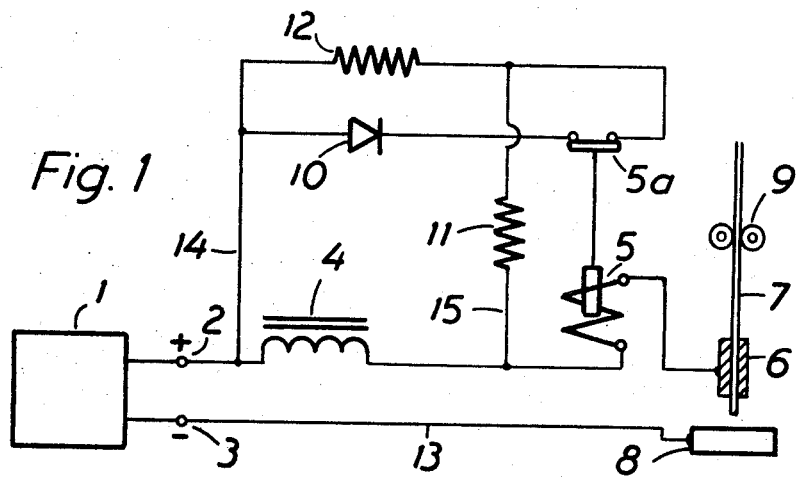
Figure 6:
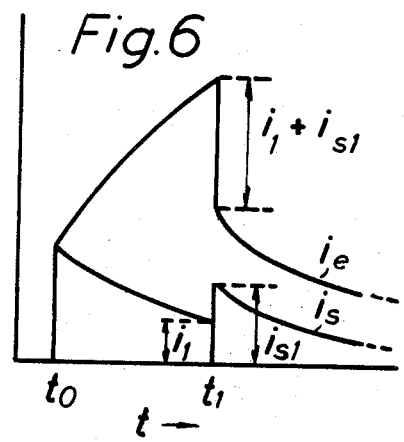
Figure 3:
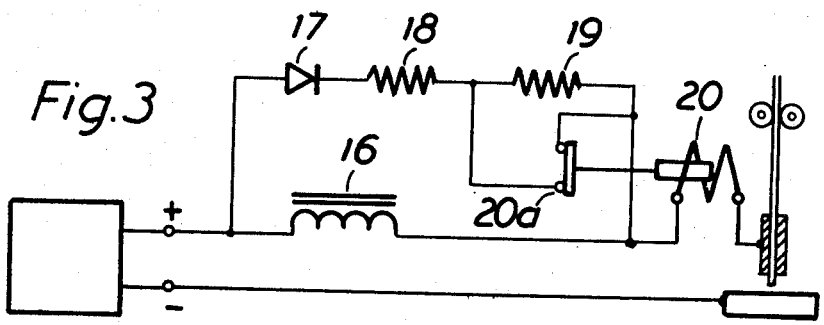
Figure 4:
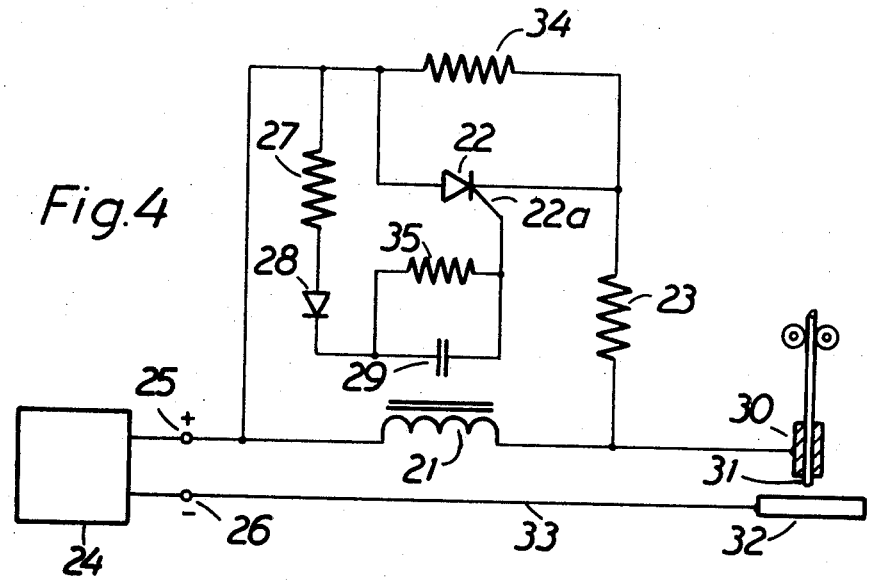
Figure 5:
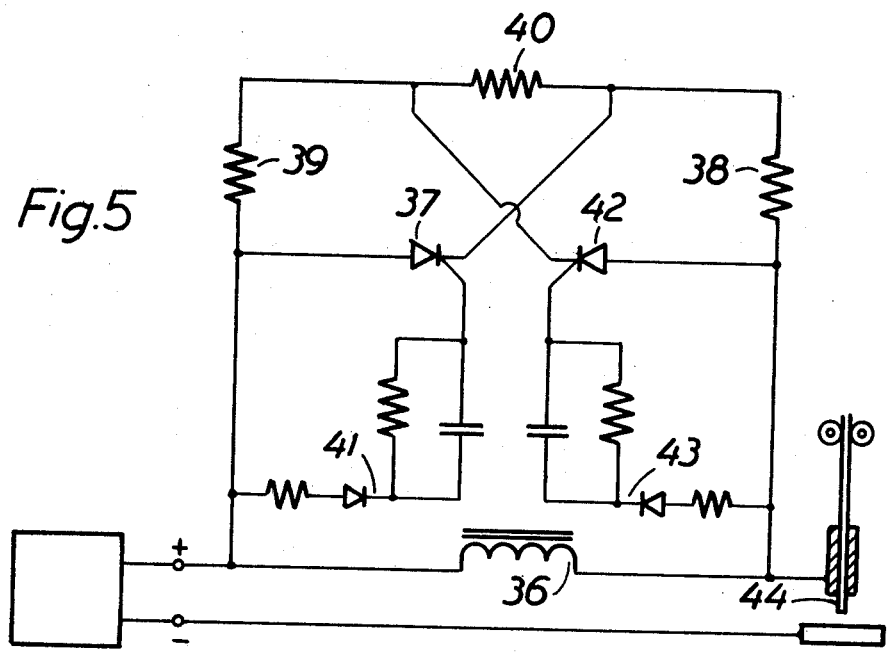

In the drawings,

FIG. 1 schematically represents one embodiment of the invention,

FIG. 2 is a current diagram illustrating the starting process obtained with apparatus according to FIG. 1, FIGS. 3, 4 and 5 schematically represent, respectively, three other embodiments of the invention, and FIG. 6 is a current diagram illustrating the starting process obtained with apparatus according to FIG. 5.

In the apparatus according to FIG. 1, the terminals 2, 3 of a D.C. source of welding power 1 are connected to a welding circuit comprising the inductor 4, the winding of the welding current relay 5, the contact tube 6, the fusible electrode 7, the work 8 and the return cable 13. The source of power 1 has a flat characteristic and may for instance be a rotary generator or a rectifier supplied by a three-phase transformer. The schematically indicated wire advancing mechanism 9 serves in a known manner to advance the electrode 7 at a constant rate. A branch containing a half-wave rectifier 10 in series with the back contact 5a of the welding current relay 5 and the resistor 11 is connected in parallel with the inductor 4. Moreover, a by-pass resistor 12 is connected across the series connection of the rectifier 10 and the contact 5a.

The welding current relay 5, the inductance of which is small compared to the inductance of the inductor 4, responds with a certain delay to energization as well as to deenergization. The apparatus is designed for short arc welding, the voltage of the source 1 being too low to maintain a stationary state in which the arc burns without interruption by short circuits. During the welding period (contact 5a open) the inductor 4 has the known function of controlling the short circuit frequency and the rate of increase of the current in such a way as to provide a quiet and regular welding process without spatter.

In the following description of the operation of the apparatus no account is at first taken of the by-pass resistor 12, which may actually be dispensed with. At the start of the welding process, the back contact 5a is closed, as there flows no welding current and the welding current relay 5 is not energized. At the moment $t_o$ (FIG. 2) in which the electrode tip makes contact with the workpiece, a current $i_o$ flows from the positive terminal 2 through the rectifier 10, the contact 5a, the resistor 11, the winding of the relay 5, the contact tube 6, the electrode 7, the workpiece 8 and the return cable 13 to the negative terminal 3. The relay 5 is energized but owing to the delay of the relay the contact 5a remains closed during a certain period. The current $i_a$ through the inductor 4 increases gradually and asymptotically approaches the static short-circuit current corresponding to the steady state. At the same time, the current $i_b$ through the rectifier 10 decreases and asymptotically approaches zero. The current through the electrode 7 is the sum of the currents $i_a$ and $i_b$. At the time $t_1$ said current has grown sufficiently to cause fusion of the electrode, so that the short circuit is terminated and an arc is ignited. The current $i_a$ through the inductor then tends to decrease, resulting in a change of direction of the inductive voltage appearing across the inductor 4. As the rectifier 10 is non-conducting in this direction, the branch 10–11 will now be currentless. Consequently, the welding current is reduced suddenly at the time $t_1$ by the value $i_1$ (the value of the current $i_b$ at the time $t_1$), and subsequently decreases gradually as the magnetic energy stored in the inductor is consumed. As the arc under the conditions given cannot burn permanently, another short circuit followed by an ignition period will occur after a certain time. As the electrode tip and the contact spot on the workpiece are now hot, the ignition this time is likely to take place more easily than the first time. Consequently, the short circuit is likely to be terminated before the current has reached the peak value attained in the first short circuit.

The delay of the operation of the relay 5 must be so adjusted that the contact 5a remains closed at least during all of the short circuit period from $t_o$ to $t_1$. As a rule, the arc period following the first ignition cannot be relied on to establish such conditions that the subsequent ignitions occur with the same ease as during the normal short arc welding process. Therefore, the delay of the operation of the relay is preferably adjusted in such a way that the contact 5a remains closed during at least the first two short circuits. The time required to attain the normal, or steady-state, welding conditions is depending on several factors, such as the material of the electrode and the workpiece, the electrode diameter and the rate of advancement. Therefore, the choice of the delay of the operation of the relay will also be depending on said factors. In welding thin sheet with steel electrodes of the diameters 0.6 – 1.2 mm, delay times of the magnitude 0.3 – 0.5 seconds have been found to be suitable.

The improved reliability of the ignition obtained with the apparatus according to the invention can be ascribed to two different factors. The first factor is that the current at the initiation of the short circuit immediately assumes a comparatively high value $i_o$, so that there is an immediate and strong discharge of energy at the point of contact between the electrode and the workpiece resulting in incipient fusion of the electrode tip. This removes or reduces a danger caused by too low initial currents, to wit, that the electrode may come into close contact with the workpiece and be effectively cooled by the workpiece before the electrode tip has started to melt. In that case, the current will rise to a very high value before the short circuit is terminated by the electrode end blowing like a fuse. The second factor is that the magnetic energy stored in the inductor at the end of the short circuit period is substantially lower than the one which would result from all of the short circuit current passing through the inductor. This reduces or eliminates the risk that the arc current at the beginning of the arc period under the action of the stored magnetic energy produces a very rapid fusion and a resulting increase of the arc length to undesirably high values, resulting in the extinction of the arc before the next short circuit, as the decreasing current will no longer be able to sustain an arc at the existing arc length.

The resistor 11 may be adjustable in order to allow an adaptation of the initial current $i_o$ to different electrode diameters and different rates of advancement.

The resistor 12, which also may be adjustable, forms, when the contact 5a is open, in series with the resistor 11 a resistance branch connected in parallel to the inductor 12, the purpose of said resistance branch being the known one of controlling the shape of the current curve during the welding period.

The conductors 14, 15 may be connected to the terminals of an auxiliary or secondary winding of the inductor 4 instead of, as shown, to the terminals of the single winding of the inductor 4. This applies to the embodiments described below as well.

FIG. 3 shows a modification of the apparatus according to FIG. 1. The inductor 16 is connected in parallel with a branch containing the half-wave rectifier 17 in series with the resistors 18 and 19, the second of which is connected in parallel with the back contact 20a of the delayed-action welding current relay 20. The resistor 18 corresponds to the resistor 11 of FIG. 1. The functioning of the apparatus during the start period is identical with the one described above with reference to FIG. 1. In the present case, the rectifier branch remains in circuit after the termination of the start period, but, owing to the insertion of the resistor 19, with a reduced conductance in the forward direction of the rectifier 17.

In the apparatus according to FIG. 4, the inductor 21, as in the apparatus according to FIG. 1, is connected in parallel with a branch containing a rectifier 22 in series with a resistor 23 corresponding to the resistor 11 of FIG. 1. The rectifier 22 is a silicon controlled rectifier (thyristor) the gate, or control electrode, 22a of which is connected to a firing circuit extending from the positive terminal 25 of the source of power 24 through a resistor 27, a half-wave rectifier 28, a capacitor 29, the control electrode 22a, the resistor 23, the contact tube 30, the welding electrode 31, the workpiece 32 and the return cable 33 to the negative terminal 26 of the source of welding power. A resistor 34 corresponding to the resistor 12 of FIG. 1 is connected in parallel with the thyristor.

The thyristor is non-conductive when no welding current flows in the circuit. When the welding process is initiated by the electrode tip being moved into contact with the workpiece, a current pulse inducing the conductive state of the thyristor flows through the ignition circuit described above. Said current pulse charges the capacitor 29 to a voltage determined not only by the constants of the ignition circuit but also by the time interval between the moment in which the ignition current starts to flow and the moment in which the charging is terminated by the thyristor's becoming conductive, said time interval being determined by the properties of the thyristor. The functioning during the short circuit period and the subsequent first ignition of the arc is identical with the one described above with reference to FIGS. 1 and 2.

For the reason explained with reference to FIG. 1, it is advisable to have the thyristor 22 in the conductive state during at least one short circuit period in addition to the first one. This necessitates re-firing of the thyristor, as it is restored to its non-conductive state at the time $t_1$. To this end, the time constant of the charging circuit is adjusted in such a way that at least two successive firing pulses are required to raise the potential of the capacitor 29 to such a level that the next charging impulse is too weak to cause firing of the thyristor 22.

The bleeder resistor (discharging resistor) 35 connected in parallel to the capacitor 29 serves on termination of a welding operation to discharge the capacitor to permit re-firing of the thyristor. The time constant of the resistor-capacitor combination 29–35 may for instance be 0.5 to 1 second and must under no circumstances be so small as to cause the capacitor to be discharged in the interval between two short circuits during the welding period to a level rendering the next charging pulse sufficiently strong to ignite the thyristor.

The following data are specified to exemplify the practical design of an apparatus according to FIG. 4. The source of welding power is a welding rectifier able to supply a welding current of 275 A at a duty cycle of 60 percent. The inductance of the inductor 21 is 0.70 mH. The resistors 23 and 34 are of 60 and 220 milliohms, respectively. The limiting resistance 27 is 100 ohms, the capacitor 29 is 1 microfarad, and the discharge resistance 35 is 1 megohm. The apparatus is substantially intended for a semi-automatic welding with steel electrodes having diameters between 0.6 and 1.2 mm.

In the apparatus shown in FIG. 5, a branch containing a thyristor 37 in series with a resistor 38 is connected in parallel with the inductor 36, the thyristor being connected in parallel with two resistors 39, 40 connected in series. The thyristor is provided with a firing circuit 41 comprising the same elements and functioning in the same way as the firing circuit of FIG. 4. This part of the apparatus works in a way entirely identical with the one of the apparatus according to FIG. 4. The series connection of the resistors 38 and 40 is connected in parallel with a second thyristor 42 having a firing circuit 43. This thyristor is connected in opposition to the thyristor 37 and thus allows in its conductive state a flow of current produced by the inductive voltage occurring at decreasing currents in the inductor 36. The current $i_e$ (FIG. 6) flowing through the electrode 44 during the arc period is not equal to the current in the inductor winding, as in the embodiments previously described, a part $i_s$ of said current being by-passed by the branch containing the thyristor 42. At the moment $t_1$ in which the arc is ignited the electrode current is reduced suddenly from the short circuit value by an amount $i_1 + i_{s1}$.

Compared to the apparatus according to FIG. 4, the apparatus according to FIG. 5 has the advantage that at equal welding currents the load on each of the two thyristors is lower than the load on the single thyristor of FIG. 4.

In the above description the simplifying assumption has been made that the welding circuit contains no other inductance than the one of the inductor 4. In actual practice, additional inductance may be present. The source of welding power usually contains substantial inductance. The short circuit current therefore does not instantaneously rise to an initial value $i_o$, but grows from zero at a certain rate of rise or steepness. An extra inductor may be inserted in the welding circuit to control the initial rate of rise of the short circuit current.

I claim:

1. Apparatus for electric arc welding comprising a D.C. source of welding power, a fusible electrode, means for advancing said electrode towards a workpiece at a constant rate, first circuit means connecting a first terminal of said source of welding power to said electrode, second circuit means connecting a second terminal of said source of welding power to the workpiece, said first circuit means having an inductor connected in series between said first terminal and said electrode, a shunt branch connected across spaced-apart points of a winding of said inductor, said shunt branch containing a resistor in series with a half-wave rectifier poled to block a flow of current through said branch caused by the voltage induced in said winding on decrease of the welding current through said inductor, and delayed operation switching means connected in said branch responsive with a delay not less than 0.3 second to a flow of welding current for reducing the conductivity of said branch in respect of currents having the direction admitted by said half-wave rectifier from an initial level to a substantially lower level.

2. Apparatus for electric arc welding comprising a D.C. source of welding power, a fusible electrode, means for advancing said electrode towards a workpiece at a constant rate, first circuit means connecting a first terminal of said source of welding power to said electrode, second circuit means connecting a second terminal of said source of welding power to the workpiece, said first circuit means having an inductor connected in series between said first terminal and said electrode, a shunt branch connected across spaced-apart points of a winding of said inductor, said shunt branch having a resistor connected in series with a silicon controlled rectifier poled to block a flow of current through said branch caused by the voltage induced in said winding on decrease of the welding current through said inductor, a firing circuit connected between the anode lead and the gate lead of the silicon controlled rectifier for causing a firing current to flow from the anode lead through said firing circuit into said gate as soon as a positive voltage differential appears between the anode lead and the cathode lead of said silicon controlled rectifier, and means for rendering said firing circuit inoperative after a predetermined period.

3. Apparatus for electric arc welding comprising a D.C. source of welding power, a fusible electrode, means for advancing said electrode towards a workpiece at a constant rate, first circuit means connecting a first terminal of said source of welding power to said electrode, a second circuit means connecting a second terminal of said source of welding power to the workpiece, said first-circuit means comprising an induction connected in series between said first terminal and said electrode, a shunt branch connected between spaced-apart points of a winding of said inductor, said shunt branch containing a resistor in series with a silicon controlled rectifier poled to block a flow of current through said branch caused by the voltage induced in said winding on decrease of the welding current flowing through said inductor, and a firing circuit for said silicon controlled rectifier comprising a capacitor, a charging resistor and a half-wave rectifier connected in series between the anode lead and the gate lead of the silicon controlled rectifier, said half-wave rectifier being poled so as to allow the flow of a positive current from said anode lead to said gate lead and said capacitor having sufficient capacity to ensure that at least two successive firing pulses are required to charge the capacitor to a voltage at which subsequent charging pulses are too weak to fire the silicon controlled rectifier.

4. Apparatus as claimed in claim 3 in which the capacitor is shunted by a bleeder resistor providing discharge of the capacitor on conclusion of a welding operation.

5. Apparatus as claimed in claim 3 which further comprises a bypass resistor connected between the anode lead and the cathode lead of the silicon controlled rectifier.

* * * * *